March 13, 1928.  W. H. HARTMAN  1,662,112

EXTRUSION MACHINE

Filed Jan. 26, 1927  2 Sheets-Sheet 1

Inventor
William H. Hartman
By Frease and Bond
Attorneys

March 13, 1928.  W. H. HARTMAN  1,662,112
EXTRUSION MACHINE
Filed Jan. 26, 1927   2 Sheets-Sheet 2

Inventor
William H. Hartman
By Freass and Bond
Attorneys

Patented Mar. 13, 1928.

1,662,112

UNITED STATES PATENT OFFICE.

WILLIAM H. HARTMAN, OF CANTON, OHIO.

EXTRUSION MACHINE.

Application filed January 26, 1927. Serial No. 163,671.

This invention relates to extrusion machines such as are used for forcing clay, shale and the like through a die for making bricks, hollow tile, other clay products, and other products made on such machines; and relates more particularly to the screw or auger by which the material is fed to the die.

The usual construction of machines of this general type includes a shaft aligned with the die and having a screw or spiral formed thereon for advancing the material through the machine to the die.

This screw or spiral terminates at a point near the forward end of the shaft and as the shaft is rotated and the forward end of the spiral is continuously changing position, there is a tendency for the material to be fed unevenly to the die, forming a continuous unevenness in the material column which emerges from the die.

The object of the present invention is to overcome this objection and to provide a machine which will forward the material evenly through the die, thus producing a uniformly straight material column.

The above and other objects may be attained by providing one or more balancing blades upon the shaft beyond the termination of the spiral and successively beyond one another.

With such a construction the spiral will advance the material to the end of the spiral and the balancing blade will advance the material forward from this point, while if several balancing blades are used, each blade advances the material from the point to which it is carried by the preceding blade.

Figure 1:
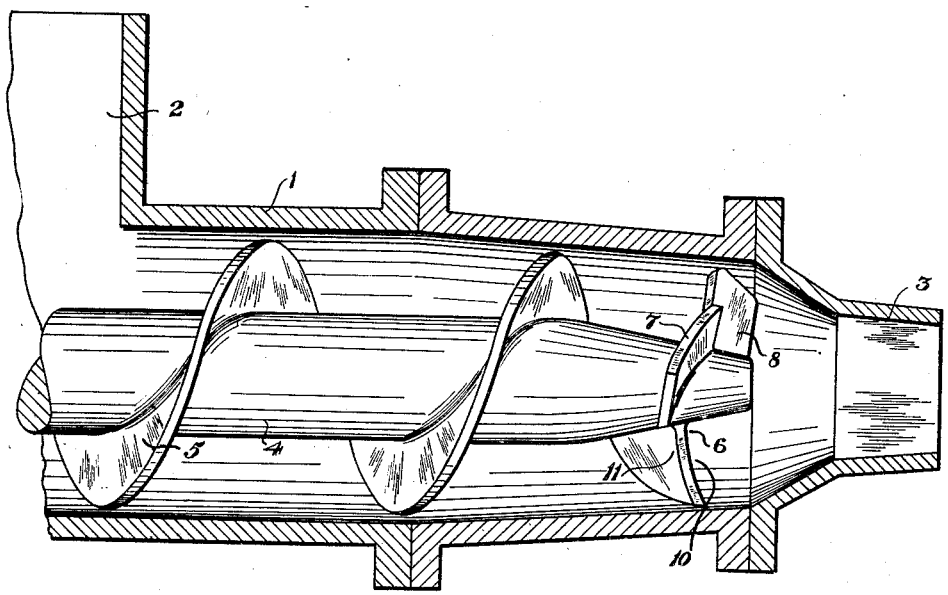
Figure 3:
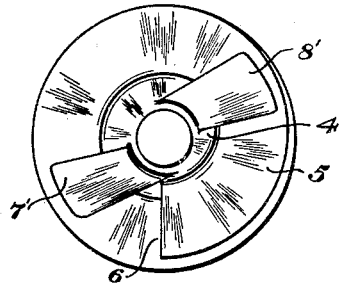
Figure 2:
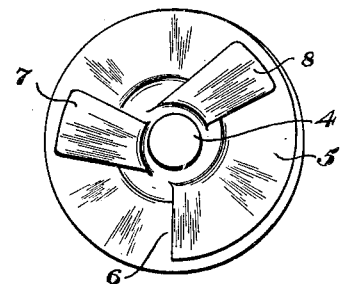
Figure 4:
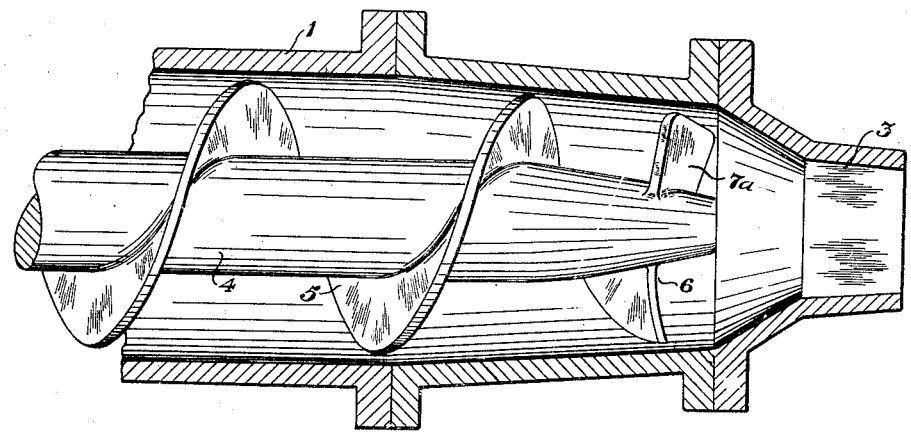

An embodiment of the invention is illustrated in the accompanying drawings, in which Figure 1 is a longitudinal sectional view through an extrusion machine embodying the invention, showing a plurality of balancing blades;

Fig. 2, an end view of the screw such as shown in Fig. 1, the balancing blades and the end of the continuous ribbon or spiral being equidistantly spaced;

Fig. 3, a view similar to Fig. 2, showing a different spacing of the blades;

Fig. 4, a view similar to Fig. 1, showing a single balancing blade, and

Figure 5:
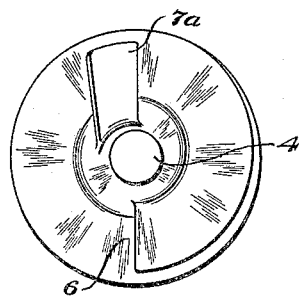

Fig. 5, an end view of the screw shown in Fig. 4.

Similar numerals refer to similar parts throughout the drawings.

The extrusion machine comprises the usual cylindrical casing 1 having the feed chamber 2 at one end and the die 3 at the other end.

The screw comprises the shaft 4 with the continuous spiral 5 adapted to feed the material forward from the feed chamber to the die, passing it out of the die in the form of a column of material which is cut into the desired bricks, tiles, blocks or the like in the usual manner.

The spiral or ribbon 5 terminates near the forward end of the shaft as shown at 6 and ordinarily as the screw or auger is rotated, and this terminal of the spiral is continuously changing position around the interior of the cylinder, the pressure upon the material being fed through the machine is not maintained equally at all points.

Thus as the material is passed through the die the pressure is continuously changing upon the material with the rotation of the screw, causing the material column to emerge from the die in a wavy or uneven form.

As illustrated in Figs. 1 and 2, a plurality of balancing blades 7 and 8 is provided upon the forward end of the shaft, the blades being located successively beyond the termination 6 of the spiral and beyond each other.

As shown in Figs. 1 and 2, these blades may be equi-distantly spaced from each other and from the termination of the spiral, although if desired, different spacing may be provided as shown at 7' and 8' in Fig. 3.

In the operation of this machine, as the screw or auger rotates, the material is carried forward by the spiral to the termination thereof, at which point the balancing blade 7 will pick up the clay and advance it further forward, the blade 8 advancing the clay from the point to which it has been carried by the blade 7. If a greater number of balancing blades are used, it will be seen that each in turn will advance the material from the point to which it has been carried by the preceding blade.

In Figs. 4 and 5 the screw is shown provided only with a single balancing blade 7ª, the other parts of the device being similar to those shown in Figs. 1 and 2. This blade 7ª is preferably located diametrically opposite to the termination 6 of the spiral, and in advance thereof.

By providing the balancing blade or blades upon the shaft it will be seen that the material is forced evenly through the die, producing a uniformly straight material column.

Where it is desired to increase or decrease the speed of the material at the center or other point, the terminal of the continuous spiral and the balancing blades may be located at varying angles. An illustration is shown in Fig. 1 in which the auger is adapted to increase the speed of the material through the center of the die. As shown in this figure, this result may be produced by locating the terminal of the spiral at an angle to the perpendicular, the outer extremity thereof, as indicated at 10, being considerably in advance of the inner end shown at 11. The blade 7 may be located at a less angle to the vertical and the blade 8 may be substantially vertical.

To increase the speed around the outer portion of the die, the blades and terminal of the spiral would be arranged substantially the opposite to that described above while the terminal end of the blades may be substantially vertical where a uniform speed is desired through the entire die.

I claim:

1. An extrusion machine including a casing, a die at one end thereof, and an auger for forcing material through the die, said auger comprising a shaft having a continuous spiral thereon terminating at the forward end portion of the shaft, and a spirally disposed balancing blade upon the shaft in advance of the end of the spiral.

2. An extrusion machine including a casing, a die at one end thereof, and an auger for forcing material through the die, said auger comprising a shaft having a continuous spiral thereon terminating at the forward end portion of the shaft, and a balancing blade upon the shaft in advance of the end of the spiral and equidistantly spaced therefrom.

3. An extrusion machine including a casing, a die at one end thereof, and an auger for forcing material through the die, said auger comprising a shaft having a continuous spiral thereon terminating at the forward end portion of the shaft, and a plurality of spirally disposed balancing blades upon the shaft in advance of the end of the spiral.

4. An extrusion machine including a casing, a die at one end thereof, and an auger for forcing material through the die, said auger comprising a shaft having a continuous spiral thereon terminating at the forward end portion of the shaft, and a plurality of balancing blades upon the shaft in advance of the end of the spiral and successively in advance of each other and located substantially in a spiral.

5. An extrusion machine including a casing, a die at one end thereof, and an auger for forcing material through the die, said auger comprising a shaft having a continuous spiral thereon terminating at the forward end portion of the shaft, and a plurality of balancing blades upon the shaft in advance of the end of the spiral and equidistantly spaced from each other and from the end of the spiral.

6. An extrusion machine including a casing, a die at one end thereof, and an auger for forcing material through the die, said auger comprising a shaft having a continuous spiral thereon terminating at the forward end portion of the shaft, and a plurality of balancing blades upon the shaft in advance of the end of the spiral, successively in advance of each other and equidistantly spaced from each other and from the end of the spiral.

7. An extrusion machine including a casing, a die at one end thereof, and an auger for forcing material through the die, said auger comprising a shaft having a continuous spiral thereon terminating at the forward end portion of the shaft, and a balancing blade upon the shaft in advance of the end of the spiral and located at an angle thereto.

8. An extrusion machine including a casing, a die at one end thereof, and an auger for forcing material through the die, said auger comprising a shaft having a continuous spiral thereon terminating at the forward end portion of the shaft, and a plurality of balancing blades upon the shaft in advance of the end of the spiral and successively in advance of each other, and located at angles to each other.

9. An extrusion machine including a casing, a die at one end thereof, and an auger for forcing material through the die, said auger comprising a shaft having a continuous spiral thereon terminating at the forward end portion of the shaft, and a plurality of balancing blades upon the shaft in advance of the end of the spiral and successively in advance of each other, and located at angles to each other and to the end of the spiral.

In testimony that I claim the above, I have hereunto subscribed my name.

WILLIAM H. HARTMAN.